United States Patent [19]
Chen

[11] Patent Number: 5,406,339
[45] Date of Patent: Apr. 11, 1995

[54] SPRING HINGE FOR SPECTACLE FRAME

[76] Inventor: Yuen-Hu Chen, No. 28, Avenue 12, Lane 76, Hsi An Road, Taichung, Province of China

[21] Appl. No.: 243,564

[22] Filed: May 16, 1994

[51] Int. Cl.⁶ .............................................. G02C 5/22
[52] U.S. Cl. ................................. 351/153; 351/113; 16/228
[58] Field of Search ............... 351/140, 153, 113, 114, 351/120, 121; 16/228

[56] References Cited

U.S. PATENT DOCUMENTS

| | | | |
|---|---|---|---|
| 4,747,183 | 5/1988 | Drlik | 16/228 |
| 5,018,242 | 5/1991 | Guy et al. | 351/113 |

FOREIGN PATENT DOCUMENTS

| | | | |
|---|---|---|---|
| 0306446 | 3/1989 | European Pat. Off. | 351/153 |
| 2340026 | 1/1977 | France | 351/121 |
| 2641382 | 7/1990 | France | 16/228 |
| 2684456 | 6/1993 | France | 351/153 |
| 2266783 | 11/1993 | United Kingdom | 16/228 |
| 2268282 | 1/1994 | United Kingdom | 351/153 |

Primary Examiner—William L. Sikes
Assistant Examiner—Huy Mai
Attorney, Agent, or Firm—Peterson, Wicks, Nemer & Kamrath

[57] ABSTRACT

A pair of spectacles includes a mechanism for securing a spectacle temple to the frame. The mechanism includes a rod having one end pivotally coupled to the frame and one or more recesses formed in the other end. A block has one end contacted with the rod and has one or more ribs for engaging with the recesses of the rod. The block is fixed to the spectacle temple. A spring biases the block toward the rod so as to engage the ribs with the recesses in order to position the block relative to the rod such that both the block and the rod can be easily engaged into the spectacle temple.

1 Claim, 5 Drawing Sheets

SPRING HINGE FOR SPECTACLE FRAME

BACKGROUND OF THE INVENTION

1. Field of the Invention

The present invention relates to a pair of spectacles, and more particularly to a mechanism for securing spectacle temples to the frame of spectacles.

2. Description of the Prior Art

A typical securing mechanism for securing spectacle temples 80 to frame 81 of spectacles is shown in FIG. 8 and comprises a rod 82 pivotally coupled to the frame 81 by a pin element 83, and a bolt 84 having one end engaged through a stop 85 and fixed to a hole 86 of the rod 82. A spring 87 is biased between the bolt 84 and the stop 85 for biasing the stop 85 toward the rod 82. The bolt 84 and the stop 85 are engaged in the hollow interior 88 of the spectacle temple 80, and a screw 89 is engaged through a hole 90 formed in the spectacle temple 80 and engaged with another hole 91 formed in the stop 85 so as to secure the stop 85 to the spectacle temple 80. It should be very careful that the stop 85 does not fixed to the rod 82 and may slide freely relative to the rod 82 such that the spectacle temple 80 may move relative to the frame 81. However, the screw 89 may engage through the stop 85 and may engage with the rod 82 such that the stop 85 may be secured to the rod 82.

The present invention has arisen to mitigate and/or obviate the afore-described disadvantages of the conventional securing mechanisms of spectacles.

SUMMARY OF THE INVENTION

The primary objective of the present invention is to provide a mechanism which may suitably secure spectacle temples to frame of spectacles.

In accordance with one aspect of the invention, there is provided a pair of spectacles comprising a frame; a spectacle temple including a first end having an opening formed therein; a rod including a first end pivotally coupled to the frame and including a second end having a first engaging means formed therein; a block including a first end facing toward the rod and having a second engaging means formed thereon for engaging with the first engaging means, the block and the rod being engaged in the opening of the spectacle temple; means for securing the block to the spectacle temple such that the block and the spectacle temple move in concert with each other; and means for biasing the block toward the rod so as to engage the second engaging means with the first engaging means in order to position the block relative to the rod.

The first engaging means includes at least one recess formed in the second end of the rod, and the second engaging means includes at least one rib formed on the first end of the block for engaging with the recess of the rod.

The securing means includes a channel formed in the block, and a pin element engaged into the spectacle temple and engaged with the channel so as to fix the block to the spectacle temple.

A bolt is engaged through the block and includes a first end fixed to the rod and a second end having an enlarged head formed thereon, the biasing means includes a spring biased between the enlarged head of the bolt and the block for biasing the block toward the rod.

The first end of the spectacle temple includes an extension formed thereon for contacting with and for engaging with the frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
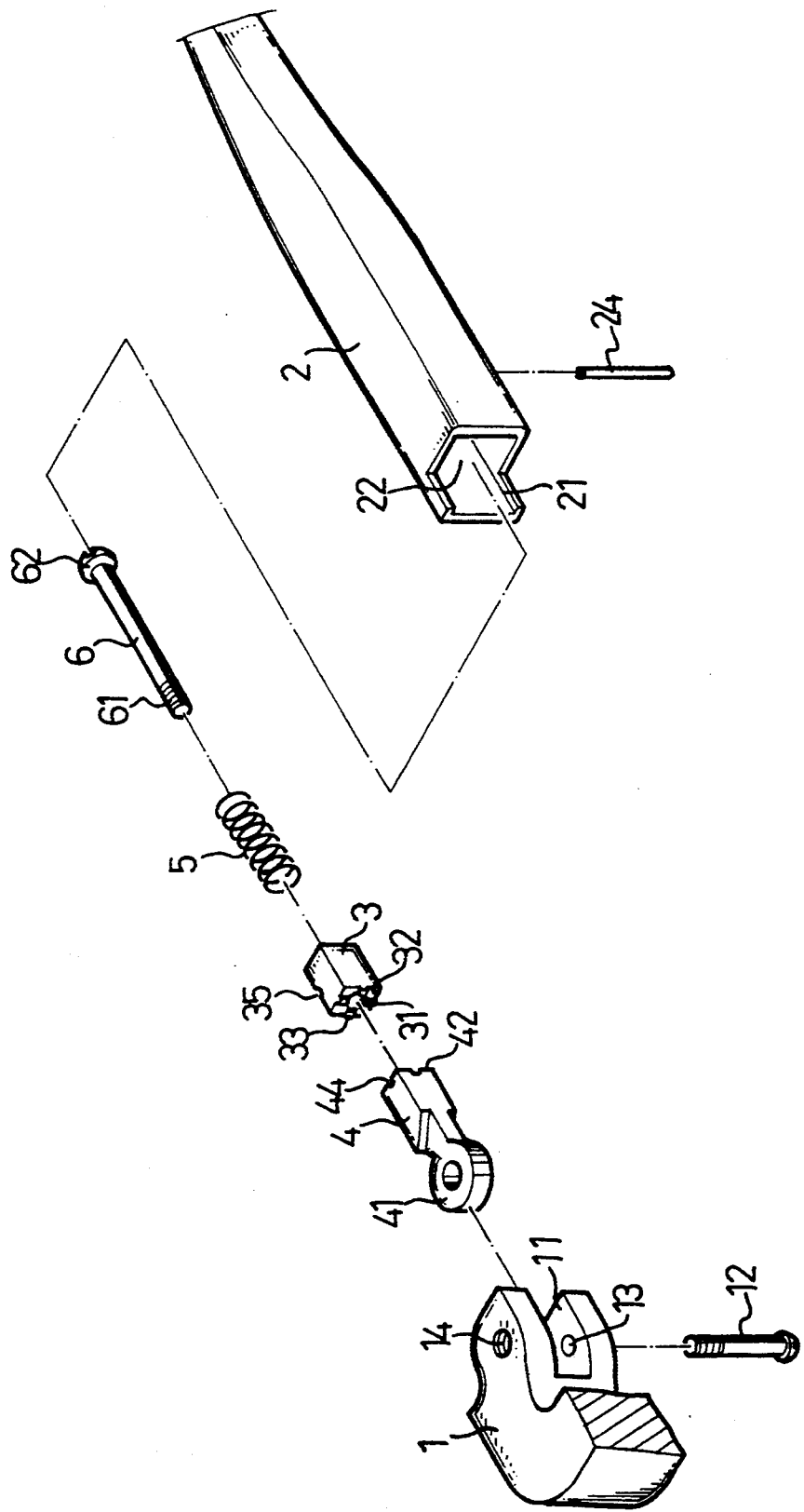
FIG. 1 is an exploded view of a mechanism for securing spectacle temples to spectacles in accordance with the present invention.
Figure 3:
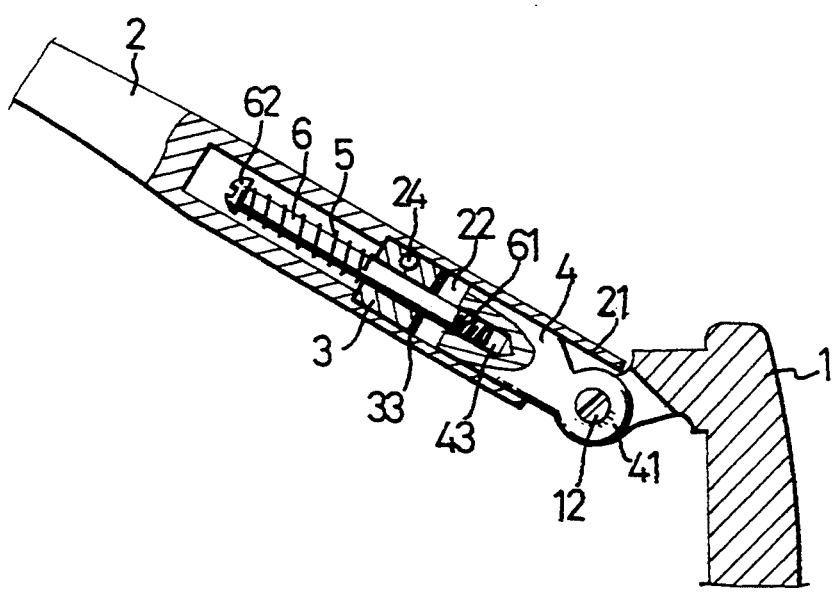
Figure 4:
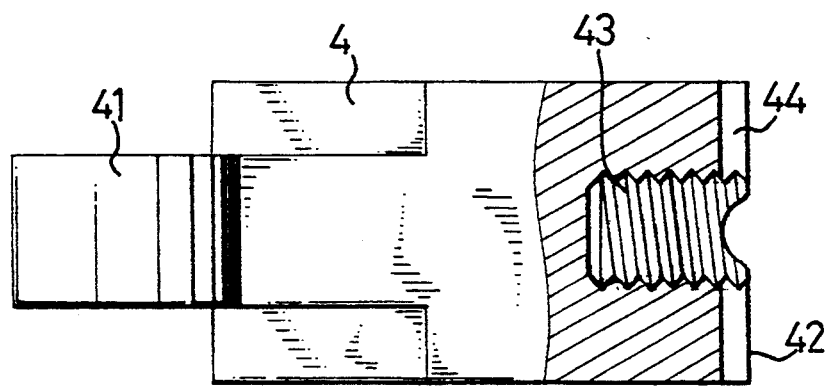
FIG. 4 is a partial cross sectional view of a rod.
Figure 5:
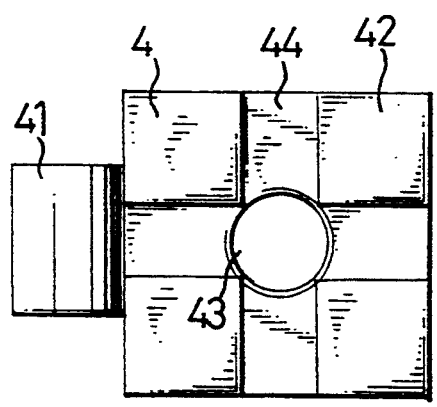
FIG. 5 is an end view of the rod.

Referring to the drawings, and initially to FIGS. 1 and 3, a mechanism in accordance with the present invention is provided for securing spectacle temples to frame of spectacles. The spectacles comprises a frame 1 including a groove 11 formed therein, and a hole 13 and a screw hole 14 formed therein for engaging with a screw 12. A rod 4 includes one end 41 engaged in the groove 11 of the frame 1 and pivotally coupled to the frame 1 by the screw 12, and includes a flat surface 42 formed in the other end distal to the frame 1. As best shown in FIGS. 4 and 5, a screw hole 43 is formed in the center portion of the surface 42, and four recesses 44 are formed in the surface 42.

Figure 6:
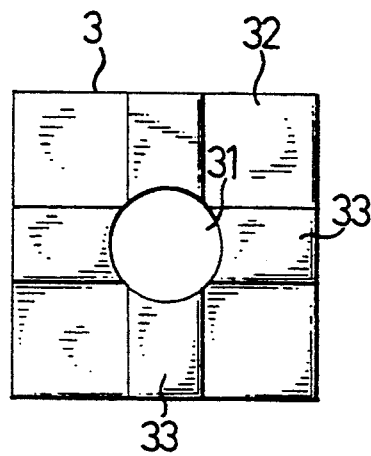
FIG. 6 is an end view of a block.
Figure 7:
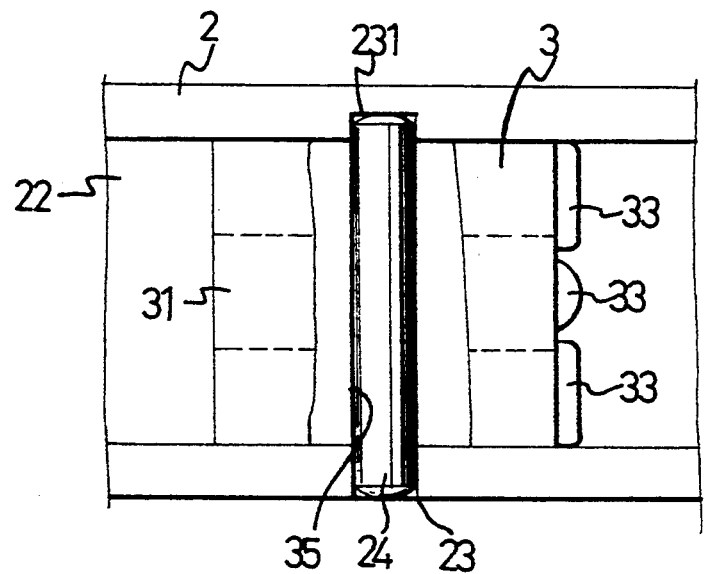
FIG. 7 is a partial cross sectional view of the block.
Figure 8:
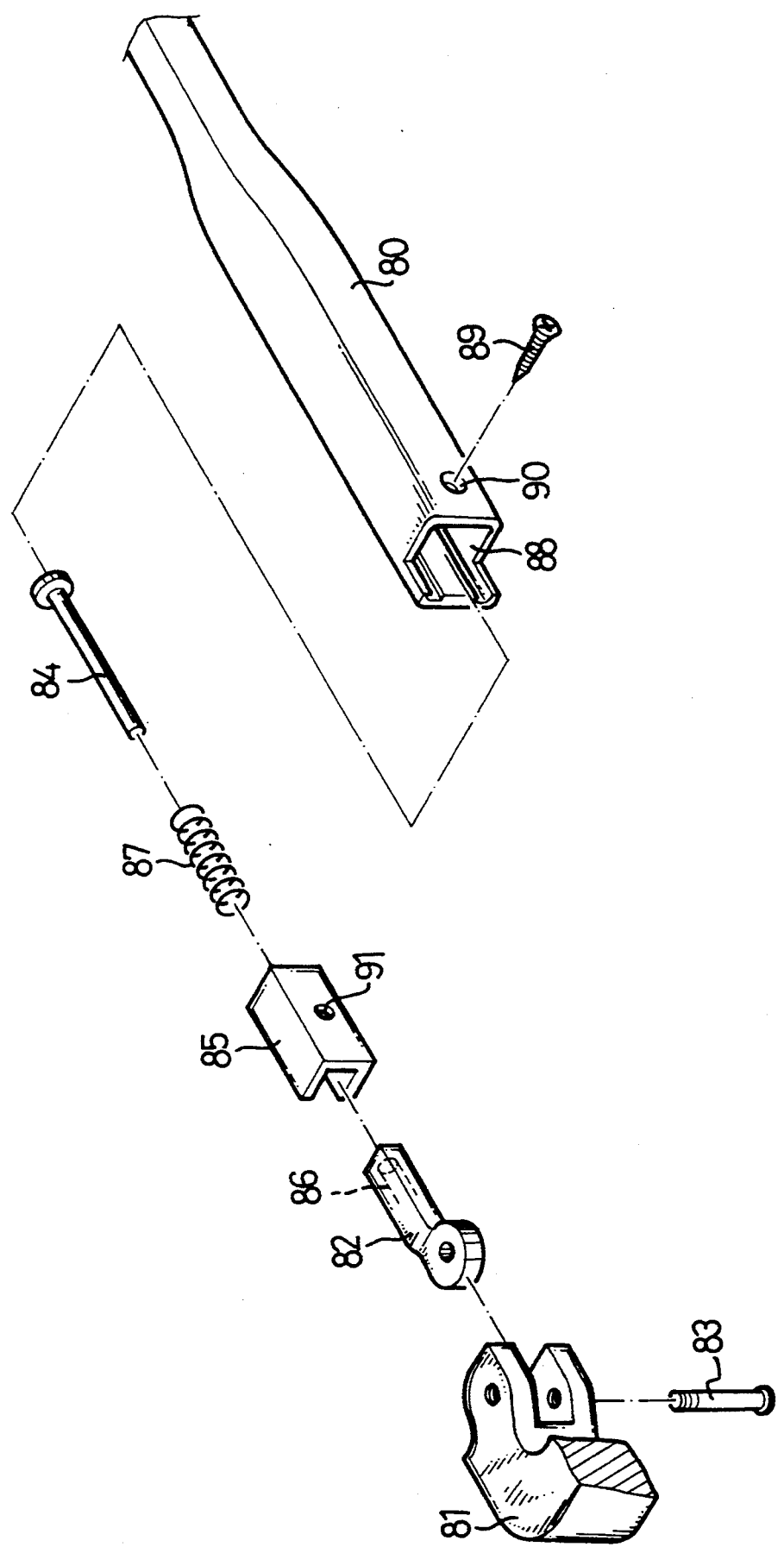
FIG. 8 is an exploded view of a typical securing mechanism of spectacles.

A block 3 includes a bore 31 formed therein and includes a flat surface 32 facing toward the rod 4. Four ribs 33 are formed on the surface 32 for engaging with the recesses 44 of the rod 4 so as to position the block 3 relative to the rod 4 such that the block 3 will not rotate relative to the rod 4. A channel 35 is formed in the block 3 for engaging with a pin 24 which is engaged in the holes 23, 231 of the spectacle temple 2, best shown in FIG. 6 and 7. A bolt 6 includes an enlarged head 62 formed on one end and an outer thread 61 formed on the other end for threadedly engaging with the screw hole 43 of the rod 4. A spring 5 is biased between the head 62 of the bolt 6 and the block 3. The spectacle temple 2 includes an opening 22 formed in one end for receiving the block 3 and the rod 4, best shown in FIG. 2, and includes an extension 21 for engaging with the frame 1.

It is preferable that the block 3 and the spectacle temple 2 are made of plastic material. The pin 24 may be heated and may be directly forced into the spectacle temple 2 and the block 3 so as to fix the block 3 to the spectacle temple 2, such that the channel 35 need not be formed previously and such that the pin 24 is not required to align with the channel 35. Whereby, the block 3 can be easily fixed to the spectacle temple 2 and may move in concert with the spectacle temple 2.

Figure 2:
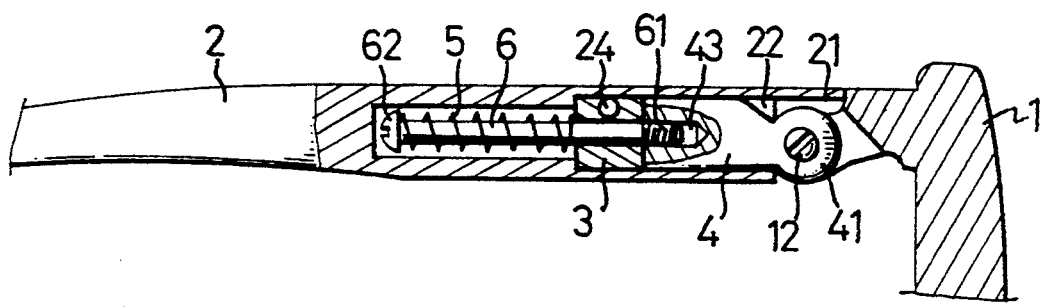
FIGS. 2 and 3 are cross sectional views illustrating the operation of the securing mechanism.

In operation, as shown in FIG. 2, both the block 3 and the spectacle temple 2 are biased toward the rod 4. When the spectacle temple 2 is rotated about the screw 12, both the block 3 and the spectacle temple 2 are forced away from the rod 4 against the spring 5 by the engagement between the end portion of the spectacle temple or the extension 21 and the frame 1.

It is to be noted that the ribs 33 of the block 3 are engaged with the recesses 44 of the rod 4 such that the block 3 can be positioned relative to the rod 4 and will not rotate relative to the rod 4. The rod 4 and the block 3 can thus be easily engaged into the opening 22 of the spectacle temple 2, such that the configuration of the securing mechanism is good for assembling purposes. If the block 3 is not positioned, the block 3 may not be suitably aligned with the rod 4 and may not be easily engaged into the opening 22.

Accordingly, the securing mechanism in accordance with the present invention includes a configuration that is good for assembling purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pair of spectacles comprising:
   a frame;
   a spectacle temple including a first end having an opening formed therein;
   a rod including a first end pivotally coupled to said frame and including a second end having at least one recess formed therein;
   a block including a first end facing toward said rod and having at least one rib formed thereon for engaging with said recess of said rod so as to position said block relative to said rod and so as to prevent said block from rotating relative to said rod, said block and said rod being engaged in said opening of said spectacle temple, said block including a channel formed therein;
   a pin element engaged into said spectacle temple and engaged with said channel so as to fix said block to said spectacle temple;
   means for securing said block to said spectacle temple such that said block and said spectacle temple move in concert with each other;
   a bolt engaged through said block and including a first end fixed to said rod and a second end having an enlarged head formed thereon, and
   means biased between said enlarged head of said bolt and said block for biasing said block toward said rod so as to engage said rib with said recess in order to position said block relative to said rod.

* * * * *